United States Patent
Li et al.

(10) Patent No.: US 9,826,391 B2
(45) Date of Patent: Nov. 21, 2017

(54) LOW POWER DEVICE TO DEVICE TRANSMISSION

(71) Applicant: Intel IP Corporation, Santa Clara, CA (US)

(72) Inventors: Qinghua Li, San Ramon, CA (US); Honggang Li, Beijing (CN); Xiaogang Chen, Beijing (CN); Huaning Niu, Milpitas, CA (US); Rongzhen Yang, Shanghai (CN)

(73) Assignee: Intel IP Corporation, Santa Clara, CA (US)

( * ) Notice: Subject to any disclaimer, the term of this patent is extended or adjusted under 35 U.S.C. 154(b) by 88 days.

(21) Appl. No.: 14/769,411

(22) PCT Filed: Dec. 17, 2013

(86) PCT No.: PCT/US2013/075801
§ 371 (c)(1),
(2) Date: Aug. 20, 2015

(87) PCT Pub. No.: WO2014/158258
PCT Pub. Date: Oct. 2, 2014

(65) Prior Publication Data
US 2015/0382365 A1    Dec. 31, 2015

Related U.S. Application Data

(60) Provisional application No. 61/806,821, filed on Mar. 29, 2013.

(51) Int. Cl.
*H04W 8/08* (2009.01)
*H04L 5/00* (2006.01)
(Continued)

(52) U.S. Cl.
CPC ............. *H04W 8/082* (2013.01); *H04B 1/56* (2013.01); *H04B 7/0417* (2013.01);
(Continued)

(58) Field of Classification Search
None
See application file for complete search history.

(56) References Cited

U.S. PATENT DOCUMENTS

2010/0110999 A1    5/2010  Li et al.
2010/0240312 A1    9/2010  Peng et al.
(Continued)

FOREIGN PATENT DOCUMENTS

WO    WO2012/049351 A1    4/2012
WO    WO 2012-144941 A1   10/2012

OTHER PUBLICATIONS

Offiice Action dated Sep. 24, 2015 for Taiwan Application No. 103111025, 21 pages.
(Continued)

*Primary Examiner* — Diane Lo
(74) *Attorney, Agent, or Firm* — Schwabe, Williamson & Wyatt, P.C.

(57) ABSTRACT

In embodiments, apparatuses, methods, and storage media may be described for allocating radio resources to a user equipment (UE) for device to device (D2D) transmission. Specifically, the UE may be configured to predict cellular interference to one or more cellular transmissions in a cell that may be caused by the transmission of a D2D signal. Based on that predicted interference, the UE may identify one or more radio resources in for the D2D transmission.

12 Claims, 5 Drawing Sheets

(51) Int. Cl.

| | | |
|---|---|---|
| H04B 1/56 | (2006.01) | |
| H04B 7/06 | (2006.01) | |
| H04W 48/16 | (2009.01) | |
| H04W 36/30 | (2009.01) | |
| H04W 24/00 | (2009.01) | |
| H04W 36/26 | (2009.01) | |
| H04W 48/18 | (2009.01) | |
| H04B 7/0417 | (2017.01) | |
| H04W 36/00 | (2009.01) | |
| H04W 36/22 | (2009.01) | |
| H04L 1/18 | (2006.01) | |
| H04W 24/02 | (2009.01) | |
| H04W 72/04 | (2009.01) | |
| H04W 72/08 | (2009.01) | |
| H04W 28/20 | (2009.01) | |
| H04L 29/06 | (2006.01) | |
| H04M 1/725 | (2006.01) | |
| H04W 4/02 | (2009.01) | |
| H04W 8/02 | (2009.01) | |
| H04W 8/06 | (2009.01) | |
| H04W 28/02 | (2009.01) | |
| H04W 76/02 | (2009.01) | |
| H04W 48/06 | (2009.01) | |
| H04L 25/03 | (2006.01) | |
| H04N 21/24 | (2011.01) | |
| H04N 21/845 | (2011.01) | |
| H04N 21/8543 | (2011.01) | |
| H04B 7/0452 | (2017.01) | |
| H04B 7/08 | (2006.01) | |
| H04L 25/02 | (2006.01) | |
| H04W 36/08 | (2009.01) | |
| H04W 48/12 | (2009.01) | |
| H04W 88/08 | (2009.01) | |
| H04W 84/04 | (2009.01) | |
| H04W 88/10 | (2009.01) | |
| H04W 84/12 | (2009.01) | |
| H04W 88/02 | (2009.01) | |
| H04W 28/08 | (2009.01) | |

(52) U.S. Cl.
CPC ........... *H04B 7/0452* (2013.01); *H04B 7/063* (2013.01); *H04B 7/0619* (2013.01); *H04B 7/0695* (2013.01); *H04B 7/088* (2013.01); *H04L 1/1864* (2013.01); *H04L 5/0048* (2013.01); *H04L 5/0051* (2013.01); *H04L 5/0057* (2013.01); *H04L 5/0085* (2013.01); *H04L 25/0206* (2013.01); *H04L 25/03305* (2013.01); *H04L 65/4092* (2013.01); *H04L 65/601* (2013.01); *H04L 65/602* (2013.01); *H04L 65/604* (2013.01); *H04L 65/607* (2013.01); *H04L 65/608* (2013.01); *H04L 65/80* (2013.01); *H04M 1/72572* (2013.01); *H04N 21/2402* (2013.01); *H04N 21/8456* (2013.01); *H04N 21/8543* (2013.01); *H04W 4/021* (2013.01); *H04W 8/02* (2013.01); *H04W 8/06* (2013.01); *H04W 24/00* (2013.01); *H04W 24/02* (2013.01); *H04W 28/0226* (2013.01); *H04W 28/0289* (2013.01); *H04W 28/20* (2013.01); *H04W 36/0005* (2013.01); *H04W 36/0011* (2013.01); *H04W 36/0022* (2013.01); *H04W 36/22* (2013.01); *H04W 36/26* (2013.01); *H04W 36/30* (2013.01); *H04W 48/06* (2013.01); *H04W 48/16* (2013.01); *H04W 48/18* (2013.01); *H04W 72/0446* (2013.01); *H04W 72/082* (2013.01); *H04W 76/025* (2013.01); *H04L 5/0007* (2013.01); *H04L 2025/03426* (2013.01); *H04W 28/085* (2013.01); *H04W 36/08* (2013.01); *H04W 48/12* (2013.01); *H04W 72/046* (2013.01); *H04W 84/042* (2013.01); *H04W 84/045* (2013.01); *H04W 84/12* (2013.01); *H04W 88/02* (2013.01); *H04W 88/08* (2013.01); *H04W 88/10* (2013.01); *Y02B 60/50* (2013.01)

(56) References Cited

U.S. PATENT DOCUMENTS

| | | | |
|---|---|---|---|
| 2011/0106952 A1* | 5/2011 | Doppler | H04W 72/0406 709/226 |
| 2011/0275382 A1 | 11/2011 | Hakola et al. | |
| 2011/0306349 A1 | 12/2011 | Hakola et al. | |
| 2012/0028672 A1 | 2/2012 | Chen et al. | |
| 2012/0051315 A1* | 3/2012 | Wang | H04W 72/082 370/329 |
| 2012/0300662 A1 | 11/2012 | Wang et al. | |
| 2013/0230032 A1* | 9/2013 | Lu | H04W 76/023 370/336 |
| 2014/0141789 A1* | 5/2014 | Tarokh | H04W 72/02 455/450 |

OTHER PUBLICATIONS

International Preliminary Report on Patentability dated Oct. 8, 2015 for International Application No. PCT/US2013/075801, 9 pages.
International Search Report and Written Opinion dated Apr. 10, 2014 for International Application No. PCT/US2013/075801, 12 pages.

* cited by examiner

LOW POWER DEVICE TO DEVICE TRANSMISSION

CROSS REFERENCE TO RELATED APPLICATIONS

The present application is a national phase entry under 35 U.S.C. §371 of International Application No. PCT/US2013/075801, filed Dec. 17, 2013, entitled "LOW POWER DEVICE TO DEVICE TRANSMISSION", which claims priority to U.S. provisional application No. 61/806,821, filed Mar. 29, 2013, entitled "ADVANCED WIRELESS COMMUNICATION SYSTEMS AND TECHNIQUES" PCT/US2013/075801 designated, among the various States, the United States of America. The Specifications of the PCT/US2013/075801 Application and U.S. provisional application No. 61/806,821 are hereby fully incorporated by reference.

FIELD

Embodiments of the present invention relate generally to the technical field of device-to-device (D2D) wireless signal communications.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure. Unless otherwise indicated herein, the approaches described in this section are not prior art to the claims in the present disclosure and are not admitted to be prior art by inclusion in this section.

Device-to-device (D2D) communication is a study item for the third generation partnership project (3GPP) long term evolution (LTE) standards. Specifically, inclusion of support for direct communication between two or more devices is being considered for the 3GPP LTE standards. However, in some cases D2D communications and cellular communications, which may involve longer range communication between a user equipment (UE) and eNodeB (eNB) may interfere with one another. For example, if two devices are communicating via D2D communications, then a cellular communication between a UE and an eNB may suffer from interference caused by the D2D communications. Similarly, the communication between an eNB and a UE may cause interference to the D2D communications.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

FIG. 4-B depicts an example of a process for identifying a transmission power threshold for a D2D transmission, in accordance with various embodiments.

DETAILED DESCRIPTION

Figure 1:
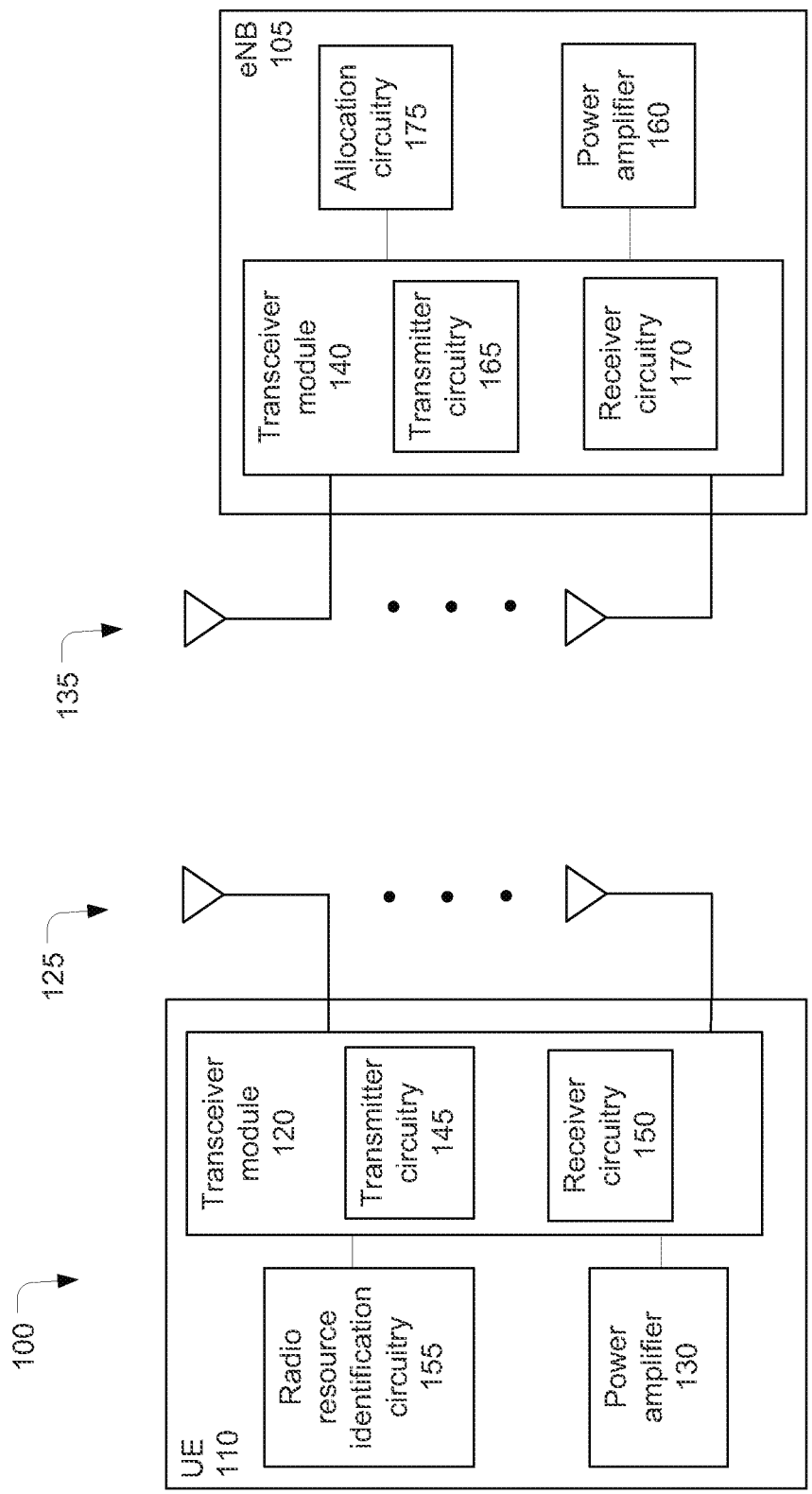
FIG. 1 schematically illustrates a high-level example of a network system comprising a UE and an eNB, in accordance with various embodiments.

Apparatuses, methods, and storage media are described herein for allowing cellular communications such as those corresponding to the third generation partnership project (3GPP) LTE standards (hereinafter referred to as "cellular communications") and device-to-device (D2D) communications to share radio resources in a wireless cell through the use of techniques such as time sharing and spatial multiplexing. Specifically, techniques are described herein for allowing normal cellular communications to run simultaneously with low power D2D communications using radio resources from the same radio resource block under certain conditions. A radio resource block may be a block of radio frequency resources that are usable during a period of time, for example different frequencies in the same radio frame or subframe, and may in some embodiments be referred to as a "zone." A radio resource in the radio resource block may be one or more frequencies in the radio resource block, and one or more start and/or end times on which a device may use that frequency to transmit a cellular or D2D signal.

As discussed herein, in some embodiments the normal cellular communications may occur in a radio cell, which may include communications over a distance as large as 100-1000 meters. By contrast D2D communications may be limited to relatively small areas such as a business, a home, a building, or some other relatively small area. In these embodiments, the D2D communications may only occur over distances as large as 10 meters, for example. Because the D2D devices are relatively close to one another, then the D2D transmission power may be relatively low as compared to the transmission power of a cellular communication. Specifically, in some embodiments this relatively lower D2D transmission power may result in the received signal strength of the D2D transmission, as perceived at the eNodeB ("eNB"), being up to 20 decibels ("dB") lower than the received signal strength of a cellular communication received at the eNB. With this relatively low transmission power and/or received signal strength, the interference caused by the D2D communication to the cellular communication may be very low, and so it may be acceptable for the cellular communication and the D2D communication to occur simultaneously. Because the operation distances of normal cellular communications and short range D2D communications are on the order of 100-1000 meters and 10 meters, respectively, this 20 dB difference in received signal strength may occur in many situations and therefore D2D communications may occur simultaneously with cellular communications, thereby improving the throughput performance of a wireless cell.

In the following detailed description, reference is made to the accompanying drawings which form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrases "A and/or B" and "A or B" mean (A), (B), or (A and B). For the purposes of the present disclosure, the phrase "A, B, and/or C" means (A), (B), (C), (A and B), (A and C), (B and C), or (A, B and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

FIG. 1 schematically illustrates a wireless communication network 100 in accordance with various embodiments. The wireless communication network 100 (hereinafter "network 100") may be an access network of a 3GPP LTE network such as evolved universal terrestrial radio access network (E-UTRAN). The network 100 may include an eNodeB (eNB, also referred to as an evolved NodeB) 105, configured to wirelessly communicate with a UE 110.

As shown in FIG. 1, the UE 110 may include a transceiver module 120. The transceiver module 120 may be coupled with one or more of a plurality of antennas 125 of the UE 110 for communicating wirelessly with other components of the network 100, e.g., eNB 105 or another UE. The antennas 125 may be powered by a power amplifier 130 which may be a component of the transceiver module 120, or coupled with the transceiver module 120 as shown in FIG. 1. In one embodiment, the power amplifier 130 may provide the power for all transmissions on the antennas 125. In other embodiments, there may be multiple power amplifiers on the UE 110. The use of multiple antennas 125 may allow for the UE 110 to use transmit diversity techniques such as spatial orthogonal resource transmit diversity (SORTD), multiple-input multiple-output (MIMO), or full-dimension MIMO (FD-MIMO).

In certain embodiments the transceiver module 120 may contain both transmitter circuitry 145 configured to cause the antennas 125 to transmit one or more signals from the UE 110, and receiver circuitry 150 configured to cause the antennas 125 to receive one or more signals at the UE 110. In some embodiments, the transmitted or received signals may be D2D signals transmitted to or received from a D2D device like another UE similar UE 110. In other embodiments the signals may be cellular signals transmitted to or received from an eNB similar to eNB 105. In other embodiments, the transceiver module 120 may be replaced by the transmitter circuitry 145 and the receiver circuitry which are separate from one another (not shown). In other embodiments, the transceiver module 120 may be coupled with processor circuitry configured to alter, process, or transform signals or data received from, or sent to, the transceiver module 120 (not shown). In some embodiments, the transceiver module 120 may be additionally coupled with radio resource identification circuitry 155 which may be configured to identify one or more radio resources on which the antennas 125 should transmit a signal from the UE 110.

Similarly to the UE 110, the eNB 105 may include a transceiver module 140. The transceiver module 140 may be further coupled with one or more of a plurality of antennas 135 of the eNB 105 for communicating wirelessly with other components of the network 100, e.g., UE 110. The antennas 135 may be powered by a power amplifier 160 which may be a component of the transceiver module 140, as shown in FIG. 1, or may be a separate component of the eNB 105. In one embodiment, the power amplifier 160 provides the power for all transmissions on the antennas 135. In other embodiments, there may be multiple power amplifiers on the eNB 105. The use of multiple antennas 135 may allow for the eNB 105 to use transmit diversity techniques such as SORTD, MIMO, or FD-MIMO. In certain embodiments the transceiver module 140 may contain both transmitter circuitry 165 configured to cause the antennas 135 to transmit one or more signals from the eNB 105, and receiver circuitry 170 configured to cause the antennas 135 to receive one or more signals at the eNB 105. In other embodiments, the transceiver module 140 may be replaced by transmitter circuitry 165 and receiver circuitry 170 which are separate from one another (not shown). In other embodiments, the transceiver module 140 may be coupled with processor circuitry configured to alter, process, or transform signals or data received from, or sent to, the transceiver module 120 (not shown). In some embodiments, the transceiver module 140 may be further coupled with allocation circuitry 175 configured to identify and allocate one or more D2D radio resources and/or 3GPP LTE radio resources to one or more UEs such as UE 110 based on predicted cellular interference, as will be described in further detail below.

Figure 2:
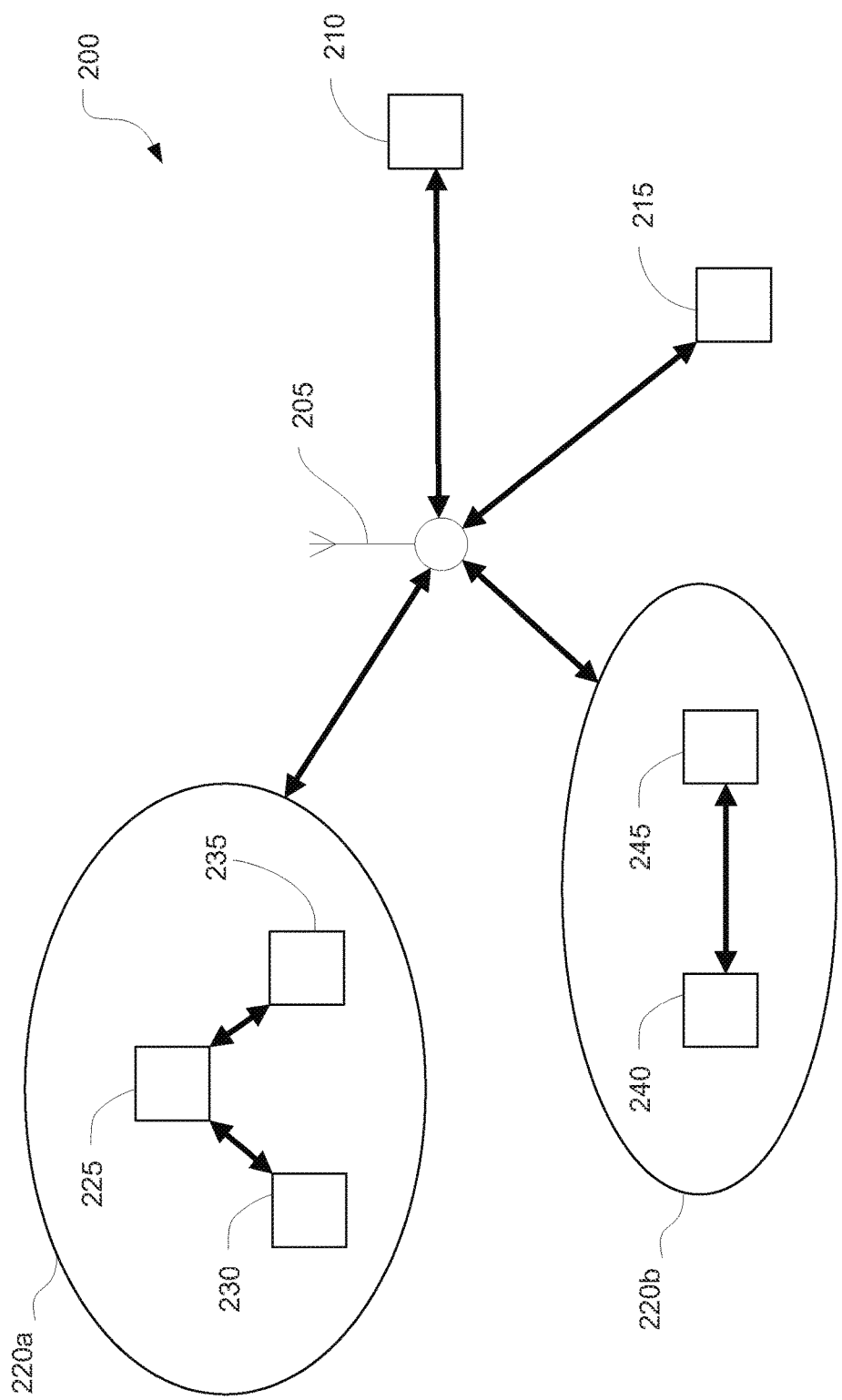
FIG. 2 depicts an example of a network including both device to device (D2D) and cellular communications, in accordance with various embodiments.

FIG. 2 depicts an example of a network 200. In some embodiments, network 200 may be a "cell" of a larger multi-cell wireless network. The network 200 may include an eNB 205 which may be similar to the eNB 105 of FIG. 1. The eNB 205 may be configured to transmit cellular communications to, or receive cellular communications from, one or more UEs 210 and 215, which may be similar to UE 110 of FIG. 1. In some embodiments, the network 200 may also include one or more D2D clusters 220a and 220b. Each D2D cluster may include two or more UEs. For example, D2D cluster 220a may include UE 225 which is in D2D communication with both UE 230 and UE 235. Similarly, D2D cluster 220b may include UE 240 and UE 245 which are in D2D communication with one another. In some embodiments, one or all of UEs 225, 230, 235, 240, and 245 may be similar to UE 110. Additionally, one or more of the UEs of D2D clusters 220a and 220b may be configured to be in cellular communication with eNB 205. For example, UE 225 may be configured to be in D2D communication with UEs 230 and 235, and also in cellular communication with eNB 205.

As described above, in some embodiments D2D communications such as those between UEs 240 and 245 may be at a lower transmission power than cellular communications such as those between eNB 205 and UE 215 or eNB 205 and UEs 240 or 245. This relatively lower transmission power may result in the D2D communications have a relatively lower received signal strength, as perceived by the eNB 205, than the received signal strength of the cellular communications. Therefore, resources from the same resource block may be used for both the D2D communications and the cellular communications. If, for example, the received signal strength at the eNB 205 of the D2D communications is approximately 20 dB lower than the received signal strength of the cellular communications from either the same UE or a different UE in the cell to the eNB 205, then resources from the same radio resource block may be used for both the D2D communications and the cellular communications because the interference between the D2D communications and the cellular communications may be relatively low.

The received signal strength difference of 20 dB is only used herein as an example, and in other embodiments the difference between the received signal strength of a D2D communication and a cellular communication may be greater or lesser than 20 dB and still produce an acceptable level of interference at the eNB 205. Specifically, to accommodate D2D communications in the same radio resource block as cellular communications, it may be desirable to prevent interference to the cellular communications caused by the D2D communications. As described above, this interference may degrade channel quality and performance of the cellular communications. If a group of D2D devices are in a large area comparable to, for example, the size of a cell in a cellular network, then the transmission power required by the D2D devices may be relatively large. In this embodiment, the interference caused to the cellular communications by the D2D communications may not be acceptable because the received signal strength at the eNB 205 of the D2D communications may be relatively high, and therefore radio resources from a radio resource block dedicated only to D2D communications may be used for the relatively high power D2D communications. In some embodiments, these radio resources may be allocated to one or more of the D2D devices such as UEs 240 and 245 of D2D cluster 220*b* by eNB 205.

By contrast, if the D2D devices are relatively close to one another, for example on the order of 10 meters apart as discussed above, then a relatively low transmission power may be used for the D2D communications between the two D2D devices. In some cases, as described above, the D2D transmission power for two devices that are relatively close to one another may be relatively low, and so the received signal strength of the D2D communications, at the eNB 205, may be up to 20 dB lower than the received signal strength of the normal cellular communications. Therefore, the D2D communication may cause relatively low interference to the normal cellular communications, which may be acceptable in many embodiments. In these embodiments, the radio resources used for the D2D communications may be in the same resource block as the radio resources used for the cellular communications. This resource block may be called a "hybrid" radio resource block. In some embodiments, this determination of an acceptable or unacceptable interference may be based off of one or more threshold values such that an interference level above the threshold value is considered an unacceptable level of interference, and an interference level below the threshold level is considered an acceptable level of interference.

In embodiments, D2D devices such as UEs 240 or 245 may be configured to use one or more radio resources in the hybrid radio resource block. In some embodiments, the UEs 240 or 245 may be able to identify the radio resources in the hybrid radio resource block, and transmit one or more D2D communications using the identified radio resources. In other embodiments, the UEs 240 or 245 may contend for the radio resources, and eNB 205 may assign the radio resources in the hybrid radio resource block to one or more of the UEs 240 or 245 for D2D communications. In some cases the eNB 205 may be configured to assign radio resources from the hybrid radio resource block for both D2D communications between UEs 240 and 245 and cellular communications between eNB 205 and UE 215. In some embodiments, the eNB may be further configured to allocate radio resources from a cellular radio resource block, which may include radio resources that are dedicated to high priority cellular communications where any interference from a D2D communication may not be acceptable.

Figure 3:
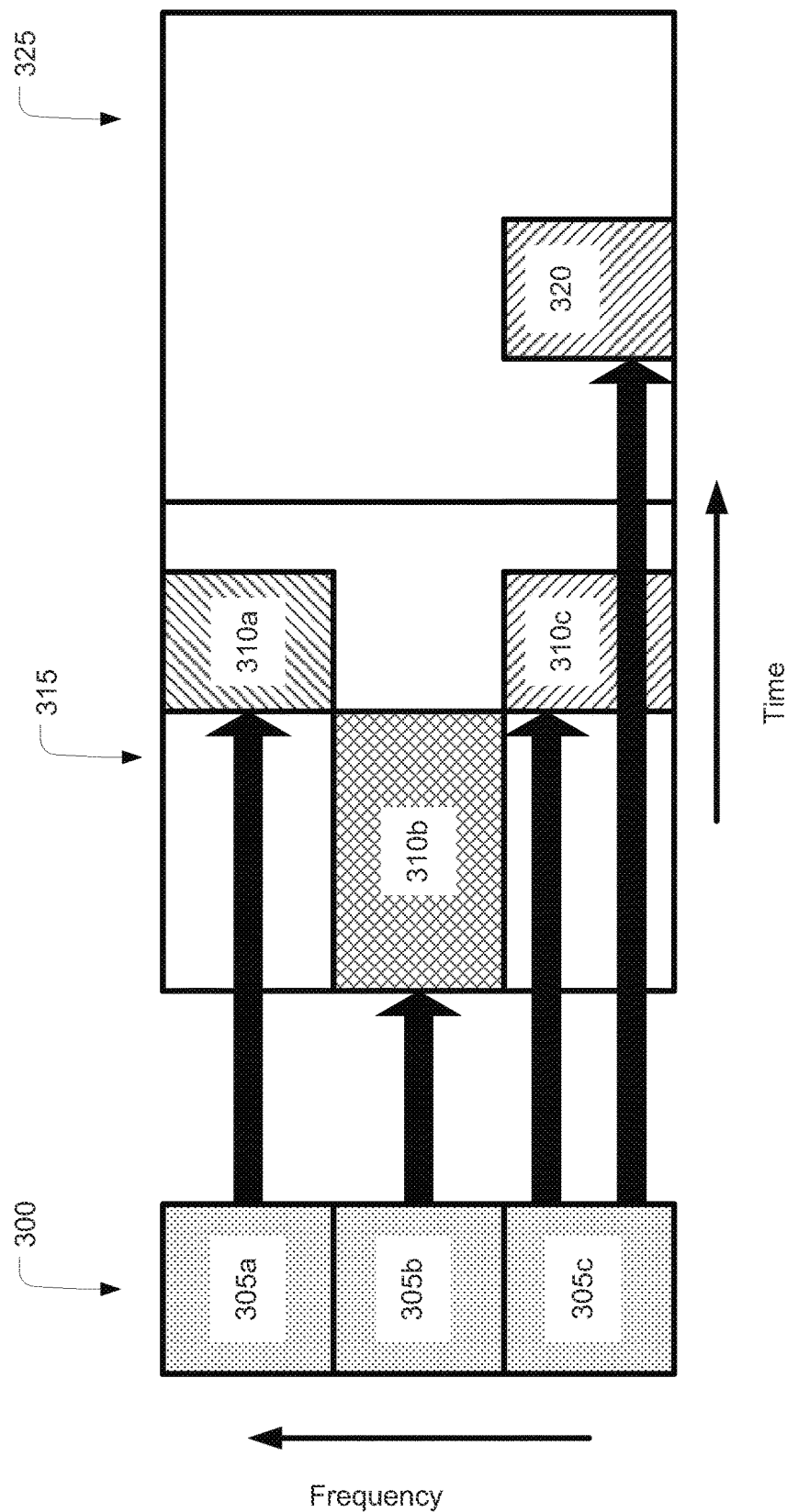
FIG. 3 depicts an example of a contention-based radio resource allocation process, in accordance with various embodiments.

FIG. 3 depicts an example of radio resource allocation using a contention process. Specifically, FIG. 3 depicts radio resources in a contention radio resource block 300, a D2D radio resource block 315, and a hybrid radio resource block 325. As shown in FIG. 3, each of the contention radio resource block 300, D2D radio resource block 315, and hybrid radio resource block 325 may include radio resources that are identified based on one or both of time and frequency.

As shown in FIG. 3, one or more UEs may contend for radio resources by transmitting a contention request in a contention radio resource block 300. As shown in FIG. 3, the contention radio resource block 300 may include three contention resources 305*a*, 305*b*, and 305*c*. Specifically, the contention radio resource block 300 may include radio resources used for uplink transmissions from a UE such as UE 110 to eNB 105. In some embodiments, the contention radio resource block may be part of a cellular radio resource block, a hybrid radio resource block, or some other radio resource block as described above.

In the example shown in FIG. 3, a plurality of UEs may request radio resources for D2D communications using the first contention resource 305*a* in the contention radio resource block 300. Similarly, a plurality of UEs may request radio resources for D2D communications by sending a contention request to an eNB using the second contention resource 305*b* in the contention radio resource block 300. Finally, a plurality of UEs may request radio resources for D2D communications by sending a contention request to an eNB using the third contention radio resource 305*c* in the contention radio resource block 300.

In response to the contention requests, the eNB may assign a first UE a first radio resource 310*a* for D2D communications in a D2D radio resource block 315. Similarly, the eNB may assign a second UE a second radio resource 310*b* for D2D communications in the D2D radio resource block 315, and a third UE a third radio resource 310*c* for D2D communications in the D2D radio resource block 315. Specifically, the eNB may assign the first, second, or third radio resources 310*a*, 310*b*, and 310*c* in the D2D radio resource block 315 because the eNB may predict that the interference to a cellular communication caused by a D2D communication from the UEs may be unacceptably high. Additionally or alternatively, the UEs may be assigned a radio resource in the D2D radio resource block 315 because the interference to the D2D communication from a cellular communication may be unacceptably high.

As a result of the contention, the eNB may further assign a hybrid radio resource 320 in the hybrid resource block 325 to the third UE for D2D communications. The hybrid radio resource 320 may be assigned to the third UE due to a determination by the eNB that the interference between a D2D communication by the UE on the hybrid radio resource 320 and another normal cellular communication in the cell will be acceptable, for example because the D2D communication by the UE will be at a relatively low power compared to the normal cellular communication.

As can be seen, in some embodiments radio resources such as radio resources 310a and 310c may overlap one another in time. Similarly, radio resources such as radio resources 310c and 320 may overlap one another in frequency. In some embodiments, two different radio resources in the hybrid radio block may overlap one another in either time or frequency. For example, a radio resource in the hybrid radio block 325 that overlaps the radio resource 320 in either time or frequency may be used for cellular communication. In some embodiments, the same radio resources in the hybrid radio resource block 325 may be assigned to a first UE for a D2D communication and a second UE for a simultaneous cellular communication, for example if it is determined that the D2D communication will not cause undesirable interference to the cellular communication as described in further detail below.

Figure 4:
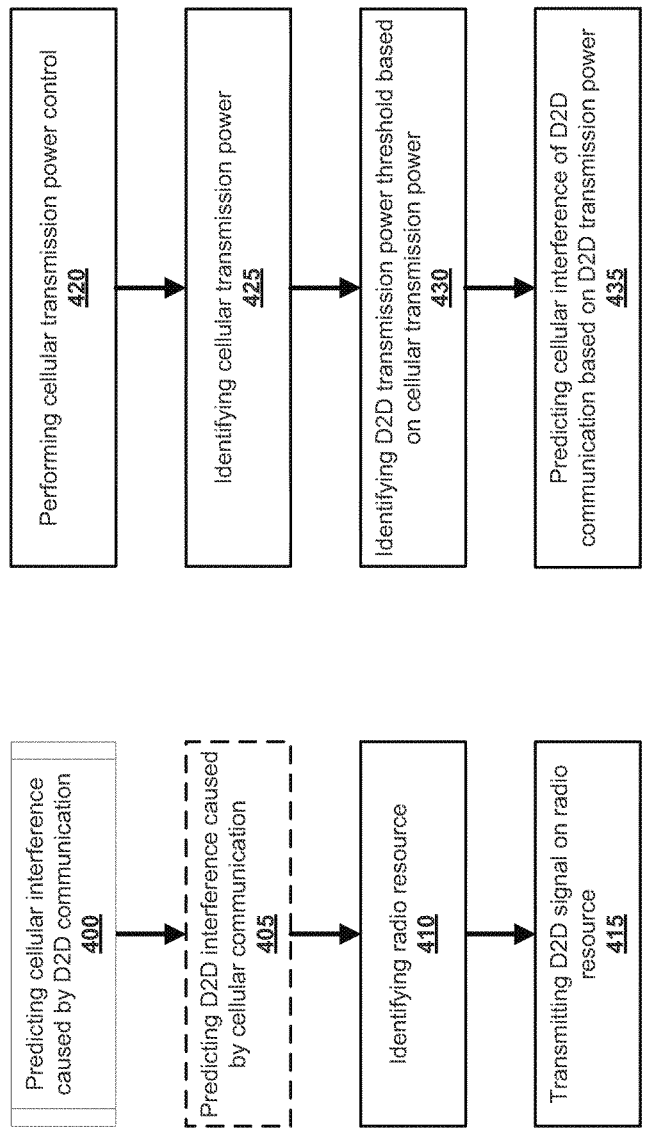
FIG. 4-A depicts an example of a process for identifying and using D2D radio resources in a network including both D2D and cellular communications, in accordance with various embodiments.

FIG. 4-A depicts an example process by which a UE such as UE 110 may identify radio resources for a D2D communication. As described in FIG. 4-A, the UE that is going to make a D2D communication will be referred to as a "D2D UE." In some embodiments, the D2D communication may be an uplink D2D communication, i.e. a communication from the D2D UE, while in other embodiments the communication may be a downlink D2D communication, i.e. a communication received by the D2D UE. Initially, the process may begin at 400 with predicting the cellular interference that may be caused by a D2D UE transmitting a D2D signal using a given radio resource at a given time. In some embodiments, as will be described in greater detail below with respect to FIG. 4-B, the prediction may be based at least in part on a power threshold of the D2D transmission. In some embodiments, this prediction at 400 may be based at least in part on a request received by the D2D UE from an eNB. Specifically, the D2D UE may have requested one or more radio resources on which to transmit a D2D signal. Based on the request from the eNB, the D2D UE may perform the measurement and predict the interference that may be caused by transmitting a D2D communication on a radio resource in the hybrid radio resource block, and report the predicted interference to the eNB. The measurement may be performed, for example, on a dedicated control channel such as the physical uplink control channel (PUCCH) or some other radio channel. In some embodiments, the interference measurement may include channel measurement and sensing. In other embodiments, the D2D UE may perform the measuring and prediction without a request from the eNB, for example if the D2D UE is attempting to identify and use radio resources in the hybrid radio resource block without requesting the radio resources from the eNB. Although not shown in FIG. 4-A, in some embodiments the UEs may report the measurements to the eNB, and the eNB may predict the interference based on the measurements received from the various UEs.

Next, in some embodiments, the D2D interference caused by a cellular signal may be predicted at 405. For example, the eNB or D2D UE may identify that another UE ("cellular UE") that is close to the D2D UE may send or receive in a cellular communication at the same time as the D2D communication of the D2D UE. For example, the cellular UE may be intending to transmit a cellular uplink signal or receiving a cellular downlink signal simultaneously with the D2D communication of the D2D UE. The D2D UE may then predict the interference to the D2D UE's D2D communication that may be caused by cellular UE's cellular communication. Although not shown, in some embodiments the eNB may predict the cellular interference that may be caused by the cellular UE's cellular communication.

Based on the predicted cellular interferences of 400 and 405, the D2D UE may then identify a radio resource at 410. In some embodiments, the D2D UE may identify the radio resource based on an indication received from the eNB. Specifically, based on the predicted cellular interferences at 400 and 405, the eNB and particularly the allocation circuitry 175 of the eNB, may identify that a D2D communication in the hybrid resource block would not cause unacceptable levels of interference to one or more cellular communications in that same resource block and/or a cellular communication in the hybrid resource block would not cause unacceptable levels of interference to the D2D communication. Therefore, the eNB may identify a radio resource in the hybrid resource block and allocate it to the D2D UE as discussed with respect to FIG. 3. Alternatively, the eNB may identify that a D2D communication to or from the D2D UE would unacceptably affect a concurrent cellular communication, and so the eNB may allocate a radio resource in the D2D resource block to the D2D UE for the D2D communication. The eNB may transmit an indication of this allocated resource to the D2D UE.

Alternatively, if the D2D UE is identifying the radio resource without a request from the eNB, the D2D UE, and particularly the radio resource identification circuitry 155 of the D2D UE, may identify based on the predicted cellular interference at 400 and 405 that a D2D communication to or from the D2D device would not cause unacceptable levels of cellular interference and/or a cellular communication would not cause unacceptable levels of interference to the D2D communication. For example, the D2D UE may identify that the D2D UE is spatially isolated enough and/or only requires a relatively low transmit power for the D2D communication. The D2D UE may then identify a radio resource in the hybrid radio resource block for the D2D communication. Alternatively, the D2D UE may identify that either the D2D communication or the cellular communication would experience unacceptable levels of interference caused by a D2D communication in the hybrid radio resource block, and so the D2D UE would identify a radio resource in the D2D resource block. Based on the identified radio resource, the D2D UE may then transmit at 415 the D2D communication on the radio resource identified at 410.

Therefore, as described above in some embodiments, the eNB may control the allocation of the radio resources for D2D communication. This control process may be based, for example, on a contention process wherein the eNB requests that one or more UEs in the cell measure current interference and/or predict future interference involving cellular communications and D2D communications. In other embodiments, the D2D UE may be configured to identify and use radio resources in the hybrid or D2D radio resource blocks without requesting a radio resource allocation from the eNB. This identification and use may be based on measured or predicted interference involving cellular communications and D2D communications.

In some embodiments, if the D2D UE is allocated radio resources in the hybrid radio resource block, then the D2D UE may perform one or more power control procedures so that the D2D communication does not create unacceptable interference to a cellular communication. For example, the D2D UE may compare and calibrate D2D transmission power with respect to the cellular uplink transmission power of the D2D UE that is adjusted by cellular power control loops. Based on that comparison, the D2D UE may reduce or otherwise alter its D2D transmission power. An example of a power control procedure is described in further detail below with respect to FIG. 4-B.

In some cases, if a D2D UE is allocated a radio resource in the hybrid radio resource block, then the D2D UE may use a lower transmission power than if the D2D UE was in the D2D radio resource block or the cellular radio resource block. In some embodiments, this power adjustment may require a change to the modulation/coding scheme used by the D2D UE for the D2D communication. In some embodiments, this change to the modulation/coding scheme may require one or more link adaptation operations.

As described above with respect to FIG. 4-A, in some embodiments the cellular interference caused by a D2D communication may be predicted at 400. As noted, in some embodiments the cellular interference may be based at least in part on identifying a transmission power threshold for the D2D communication. For example, in some embodiments one or both of the D2D UE or the eNB may identify the maximum transmission power at which the D2D UE may transmit the D2D communication without causing interference to cellular communications in the cell.

FIG. 4-B illustrates an example process for identifying a transmission power threshold for D2D communications based on predicted cellular interference. Initially, power control for cellular transmissions may be performed at 420. In embodiments, the eNB may perform power control for uplink cellular communications of one or more of the UEs in the cell. The power control may be based on ensuring that the signal strength of cellular communications received from the UEs at the eNB are approximately equal. The cellular transmission power control may therefore involve the eNB receiving one or more cellular communications from each UE, for example an uplink cellular communication on the PUCCH as described above, and then providing feedback to the UE to adjust the UEs cellular transmission power. In embodiments, the power control may involve closed loop power control, open loop power control, or some other type of power control.

As a result of the cellular transmission power control at 420, the eNB may receive signals from UEs that are relatively close to the eNB and UEs that are relatively far from the eNB with approximately the same signal strength. Additionally, the eNB may receive cellular uplink communications from UEs in the cell without significant inter-signal interference. Without the cellular transmission power control at 420, a strong signal from a UE that is relatively close to the eNB may cause a strong interference to a signal from a UE that is relatively far from the eNB based on out-of-band emissions or beamforming leakage.

Based on the cellular transmission power control at 420, the cellular transmission power of a D2D UE may be identified at 425. Specifically, the cellular transmission power assigned to the D2D UE by the eNB during the cellular transmission power control at 420 may be identified at 425. In some embodiments, the D2D UE may identify the cellular transmission power assigned by the eNB if the D2D UE is independently identifying the radio resource for a D2D communication, as described above. In other embodiments, for example if the eNB is assigning the radio resource as described above, the eNB may identify the cellular transmission power of the D2D UE at 425. In some embodiments this may be based on the eNB independently identifying the cellular transmission power of the D2D UE, or the D2D UE transmitting an indication of the assigned cellular transmission power to the eNB.

This assigned cellular transmission power may then be used as a reference to identify an upper threshold for the D2D transmission power of a D2D communication from the D2D UE at 430. Specifically, the upper threshold of the D2D transmission power may be approximately equivalent to the cellular transmission power identified at 425 because the interference caused by a D2D communication at the same transmission power as the cellular transmission power may cause the same interference at the eNB as a cellular transmission from the D2D UE at the cellular transmission power. As noted above with respect to the cellular transmission power control, this may be an acceptable level of interference.

In some embodiments the upper threshold for the D2D transmission power may be the maximum D2D transmission power available to the D2D UE without causing undesirable interference to cellular transmissions received by the eNB. In some embodiments, the upper threshold may be identified as less than the cellular transmission power of the D2D UE. For example, if the D2D UE transmits a D2D communication at a power level 20 dB below the cellular transmission power of the D2D UE, then the received signal strength of the D2D communication at the eNB may be 20 dB lower than the received signal strength of a cellular communication from another UE. Therefore, the interference caused by the D2D communication may be relatively low. In embodiments, the D2D transmission power threshold may be identified either by the D2D UE if the D2D UE is independently identifying the radio resource for the D2D communication, or by the eNB if the eNB is assigning the D2D communication radio resource as described above.

The D2D transmission power threshold may then be used to predict the cellular interference caused by the D2D signal at 435. For example, if a D2D communication sent at or below the D2D transmission power threshold is sufficient to be received at a receiving D2D UE, then the predicted interference caused by the D2D communication to a cellular communication in the cell may be acceptable and the use of a radio resource in the hybrid radio resource block may be permitted. However, if a D2D communication sent at or below the D2D transmission power threshold would not be received correctly at a receiving D2D UE, then a higher D2D transmission power may be needed. The D2D communication at the higher D2D transmission power may cause an undesirable level of interference to a cellular communication in the cell, and so the use of a radio resource in the hybrid radio resource block may not be permitted.

In some embodiments the D2D UE may be configured to predict the cellular interference at 435, for example if the D2D UE is using the predicted cellular interference to independently identify a radio resource for the D2D communication or if the D2D UE is tasked with providing an indication of the predicted cellular interference to the eNB so that the eNB can allocate a D2D communication radio resource to the D2D UE. Additionally or alternatively the eNB may be configured to predict the cellular interference at 435. As described above, one or more elements of the process of FIG. 4-B may be performed by one or both of the UE and/or the eNB, dependent on the network implementation and different indications of transmission power or predicted interference that are transmitted between the UE or the eNB. The above described process is merely an example embodiment and other embodiments may be used in other networks.

Figure 5:
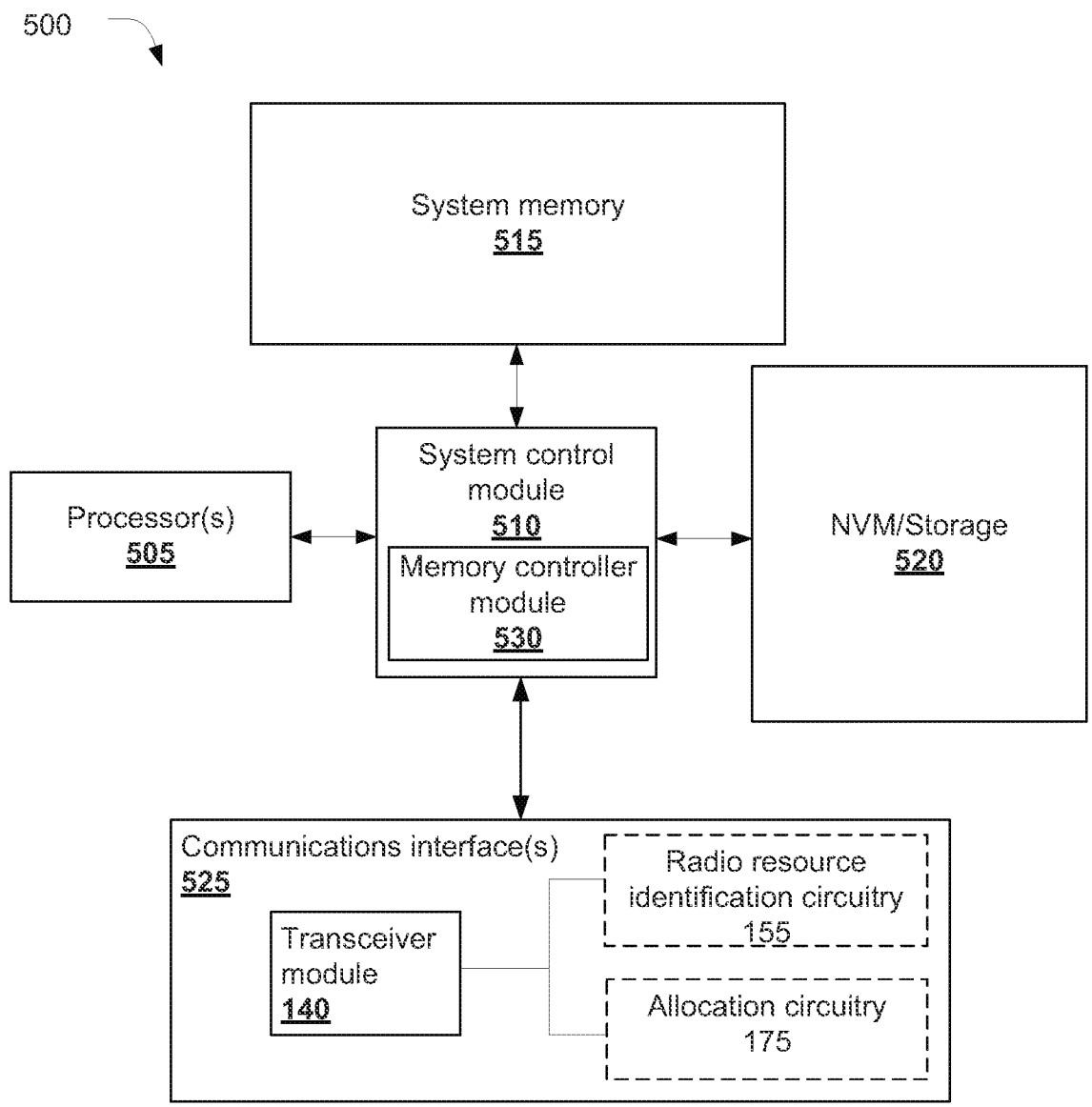
FIG. 5 schematically illustrates an example system that may be used to practice various embodiments described herein.

Embodiments of the present disclosure may be implemented into a system using any suitable hardware and/or software to configure as desired. FIG. 5 schematically illustrates an example system 500 that may be used to practice various embodiments described herein. FIG. 5 illustrates, for one embodiment, an example system 500 having one or more processor(s) 505, system control module 510 coupled to at least one of the processor(s) 505, system memory 515 coupled to system control module 510, non-volatile memory (NVM)/storage 520 coupled to system control module 510, and one or more communications interface(s) 525 coupled to system control module 510.

In some embodiments, the system 500 may be capable of functioning as the UEs 110, 210, 215, 225, 230, 235, 240, or 245 as described herein. In other embodiments, the system 500 may be capable of functioning as the eNBs 105 or 205 as described herein. In some embodiments, the system 500 may include one or more computer-readable media (e.g., system memory or NVM/storage 520) having instructions and one or more processors (e.g., processor(s) 505) coupled with the one or more computer-readable media and configured to execute the instructions to implement a module to perform actions described herein.

System control module 510 for one embodiment may include any suitable interface controllers to provide for any suitable interface to at least one of the processor(s) 505 and/or to any suitable device or component in communication with system control module 510.

System control module 510 may include memory controller module 530 to provide an interface to system memory 515. The memory controller module 530 may be a hardware module, a software module, and/or a firmware module.

System memory 515 may be used to load and store data and/or instructions, for example, for system 500. System memory 515 for one embodiment may include any suitable volatile memory, such as suitable DRAM, for example. In some embodiments, the system memory 515 may include double data rate type four synchronous dynamic random-access memory (DDR4 SDRAM).

System control module 510 for one embodiment may include one or more input/output (I/O) controller(s) to provide an interface to NVM/storage 520 and communications interface(s) 525.

The NVM/storage 520 may be used to store data and/or instructions, for example. NVM/storage 520 may include any suitable non-volatile memory, such as flash memory, for example, and/or may include any suitable non-volatile storage device(s), such as one or more hard disk drive(s) (HDD(s)), one or more compact disc (CD) drive(s), and/or one or more digital versatile disc (DVD) drive(s), for example.

The NVM/storage 520 may include a storage resource physically part of a device on which the system 500 may be installed or it may be accessible by, but not necessarily a part of, the device. For example, the NVM/storage 520 may be accessed over a network via the communications interface(s) 525.

Communications interface(s) 525 may provide an interface for system 500 to communicate over one or more network(s) and/or with any other suitable device. The system 500 may wirelessly communicate with the one or more components of the wireless network in accordance with any of one or more wireless network standards and/or protocols. In some embodiments the communications interface(s) 525 may include the transceiver module 140 and/or radio resource identification circuitry 155 or allocation circuitry 175 of FIG. 1, dependent on whether the system 500 is function as UE 110 or eNB 105.

For one embodiment, at least one of the processor(s) 505 may be packaged together with logic for one or more controller(s) of system control module 510, e.g., memory controller module 530. For one embodiment, at least one of the processor(s) 505 may be packaged together with logic for one or more controllers of system control module 510 to form a System in Package (SiP). For one embodiment, at least one of the processor(s) 505 may be integrated on the same die with logic for one or more controller(s) of system control module 510. For one embodiment, at least one of the processor(s) 505 may be integrated on the same die with logic for one or more controller(s) of system control module 510 to form a System on Chip (SoC).

In some embodiments the processor(s) 505 may include or otherwise be coupled with one or more of a graphics processor (GPU) (not shown), a digital signal processor (DSP) (not shown), wireless modem (not shown), digital camera or multimedia circuitry (not shown), sensor circuitry (not shown), display circuitry (not shown), and/or GPS circuitry (not shown).

In various embodiments, the system 500 may be, but is not limited to, a server, a workstation, a desktop computing device, or a mobile computing device (e.g., a laptop computing device, a handheld computing device, a tablet, a netbook, a smart phone, a gaming console, etc.). In various embodiments, the system 500 may have more or less components, and/or different architectures. For example, in some embodiments, the system 500 includes one or more of a camera, a keyboard, liquid crystal display (LCD) screen (including touch screen displays), non-volatile memory port, multiple antennas, graphics chip, application-specific integrated circuit (ASIC), and speakers.

Methods and apparatuses are provided herein for Example 1 may include a user equipment (UE) comprising: radio resource identification circuitry to identify a first radio resource in a radio frame based at least in part on a predicted cellular interference caused by a transmission of a device-to-device (D2D) signal by the UE on the first radio resource at a first power level to a transmission of a predicted third generation partnership project (3GPP) long term evolution (LTE) signal; and transmitter circuitry coupled with the radio resource identification circuitry, the transmitter circuitry further to transmit the D2D signal on the first radio resource at the first power level at a time of a transmission of an uplink 3GPP LTE signal on a second radio resource in the radio frame by a second UE at a second power level.

Example 2 may include the UE of example 1, wherein a received signal strength at an eNodeB (eNB) of the D2D signal is less than a received signal strength at the eNB of the uplink 3GPP LTE signal.

Example 3 may include the UE of example 1, wherein the radio resource identification circuitry is further to identify the first radio resource based at least in part on a predicted D2D interference to the D2D signal caused by the transmission of the predicted 3GPP LTE signal.

Example 4 may include the UE of example 1, wherein the radio resource identification circuitry is further to determine the predicted cellular interference.

Example 5 may include the UE of example 4, wherein the predicted cellular interference is based at least in part on a D2D transmission power threshold.

Example 6 may include the UE of example 1, wherein the first radio resource and the second radio resource at least partially overlap one another in time or frequency.

Example 7 may include the UE of any of examples 1-6, wherein the predicted 3GPP LTE signal is an uplink signal and the predicted cellular interference is predicted cellular interference experienced by an eNodeB (eNB).

Example 8 may include the UE of any of examples 1-6, wherein the predicted 3GPP LTE signal is a downlink signal and the predicted cellular interference is predicted cellular interference experienced by the UE.

Example 9 may include the UE of any of examples 1-6, wherein the radio resource identification circuitry is further to identify the first radio resource based at least in part on an indication of the first radio resource received by the UE from an eNodeB.

Example 10 may include the UE of any of examples 1-6, further comprising a touchscreen display coupled with the processor circuitry.

Example 11 may include a method comprising: predicting, by a user equipment (UE), a cellular interference that would be caused by a device-to-device (D2D) signal transmitted by the UE in a radio frame at a first power level to a third generation partnership project (3GPP) long term evolution (LTE) signal in the radio frame; identifying, by the UE, a radio resource in the radio frame based at least in part on the predicted cellular interference; and transmitting, by the UE, the D2D signal on the radio resource.

Example 12 may include the method of example 11, wherein the 3GPP LTE signal is a 3GPP LTE uplink signal, and the cellular interference is cellular interference at an eNodeB.

Example 13 may include the method of example 11, wherein the UE is a first UE, the 3GPP LTE signal is a 3GPP LTE downlink signal, and the cellular interference is cellular interference at a second UE.

Example 14 may include the method of any of examples 11-13, wherein the identifying the radio resource is based at least in part on receiving, by the UE, an indication of the radio resource from an eNodeB.

Example 15 may include the method of any of examples 11-13, wherein the identifying the radio resource in the radio frame is further based at least in part on predicting a D2D cellular interference caused by the transmission of the 3GPP LTE signal in the radio frame.

Example 16 may include an eNodeB (eNB) comprising: a receiver to receive a request from a user equipment (UE) for a radio resource allocation of a radio resource for a transmission of a device-to-device (D2D) signal; and allocation circuitry coupled with the receiver, the allocation circuitry to: predict a cellular interference to a third generation partnership project (3GPP) long term evolution (LTE) signal caused by the transmission of the (D2D) signal by the UE; allocate a D2D radio resource of a radio frame configured to carry only D2D signals to the UE if the cellular interference is above a threshold; and allocate a hybrid radio resource of a radio frame configured to carry D2D signals and 3GPP LTE signals to the UE if the cellular interference is below the threshold.

Example 17 may include the eNB of claim 16, further comprising a transmitter coupled with the resource allocation circuitry, the transmitter to transmit the indication of the D2D radio resource or the hybrid radio resource to the UE.

Example 18 may include the eNB of example 16, wherein the 3GPP LTE signal is an uplink 3GPP LTE signal.

Example 19 may include the eNB of example 16, wherein the 3GPP LTE signal is a downlink 3GPP LTE signal.

Example 20 may include the eNB of any of examples 16-19, wherein the UE is a first UE, and the transmitter is further to transmit a measurement request to the first UE and a second UE; and wherein the receiver is further to receive, in response to the measurement request, a measurement of current cellular interference experienced by the first UE and the second UE.

Example 21 may include an apparatus comprising: means to predict a cellular interference that would be caused by a device-to-device (D2D) signal transmitted by the UE in a radio frame at a first power level to a third generation partnership project (3GPP) long term evolution (LTE) signal in the radio frame; means to identify a radio resource in the radio frame based at least in part on the predicted cellular interference; and means to transmit the D2D signal on the radio resource.

Example 22 may include the apparatus of example 21, wherein the 3GPP LTE signal is a 3GPP LTE uplink signal, and the cellular interference is cellular interference at an eNodeB.

Example 23 may include the apparatus of example 21, wherein the UE is a first UE, the 3GPP LTE signal is a 3GPP LTE downlink signal, and the cellular interference is cellular interference at a second UE.

Example 24 may include the apparatus of any of examples 21-23, wherein the means to identify the radio resource include means to receive an indication of the radio resource from an eNodeB.

Example 25 may include the apparatus of any of examples 21-23, wherein the means to identify the radio resource in the radio frame include means to predict a D2D cellular interference caused by the transmission of the 3GPP LTE signal in the radio frame.

Example 26 may include one or more computer readable media comprising instructions, upon execution of the instructions by a computing device, to: predict a cellular interference that would be caused by a device-to-device (D2D) signal transmitted by the UE in a radio frame at a first power level to a third generation partnership project (3GPP) long term evolution (LTE) signal in the radio frame; identify a radio resource in the radio frame based at least in part on the predicted cellular interference; and transmit the D2D signal on the radio resource.

Example 27 may include the one or more computer readable media of example 26, wherein the 3GPP LTE signal is a 3GPP LTE uplink signal, and the cellular interference is cellular interference at an eNodeB.

Example 28 may include the one or more computer readable media of example 26, wherein the UE is a first UE, the 3GPP LTE signal is a 3GPP LTE downlink signal, and the cellular interference is cellular interference at a second UE.

Example 29 may include the one or more computer readable media of any of examples 26-28, wherein the instructions to identify the radio resource include instructions to receive an indication of the radio resource from an eNodeB.

Example 30 may include the one or more computer readable media of any of examples 26-28, wherein the instructions to identify the radio resource in the radio frame include instructions to predict a D2D cellular interference caused by the transmission of the 3GPP LTE signal in the radio frame.

Example 31 may include a method comprising: receiving, at an eNodeB, a request from a user equipment (UE) for a radio resource allocation of a radio resource for a transmission of a device-to-device (D2D) signal; predicting, at the eNB, a cellular interference to a third generation partnership project (3GPP) long term evolution (LTE) signal caused by the transmission of the (D2D) signal by the UE; allocating, at the eNB, a D2D radio resource of a radio frame configured to carry only D2D signals to the UE if the cellular interference is above a threshold; and allocating, at the eNB, a hybrid radio resource of a radio frame configured to carry D2D signals and 3GPP LTE signals to the UE if the cellular interference is below the threshold.

Example 32 may include the method of example 31, further comprising transmitting the indication of the D2D radio resource or the hybrid radio resource to the UE.

Example 33 may include the method of example 31, wherein the 3GPP LTE signal is an uplink 3GPP LTE signal.

Example 34 may include the method of example 31, wherein the 3GPP LTE signal is a downlink 3GPP LTE signal.

Example 35 may include the method of any of examples 31-34, wherein the UE is a first UE, and further comprising transmitting, from the eNB, a measurement request to the first UE and a second UE; and receiving, from the eNB in response to the measurement request, a measurement of current cellular interference experienced by the first UE and the second UE.

Example 36 may include an apparatus comprising: means to receive a request from a user equipment (UE) for a radio resource allocation of a radio resource for a transmission of a device-to-device (D2D) signal; means to predict a cellular interference to a third generation partnership project (3GPP) long term evolution (LTE) signal caused by the transmission of the (D2D) signal by the UE; means to allocate a D2D radio resource of a radio frame configured to carry only D2D signals to the UE if the cellular interference is above a threshold; and means to allocate a hybrid radio resource of a radio frame configured to carry D2D signals and 3GPP LTE signals to the UE if the cellular interference is below the threshold.

Example 37 may include the apparatus of example 36, further comprising means to transmit the indication of the D2D radio resource or the hybrid radio resource to the UE.

Example 38 may include the apparatus of example 36, wherein the 3GPP LTE signal is an uplink 3GPP LTE signal.

Example 39 may include the apparatus of example 36, wherein the 3GPP LTE signal is a downlink 3GPP LTE signal.

Example 40 may include the apparatus of any of examples 36-39, wherein the UE is a first UE, and further comprising means to transmit a measurement request to the first UE and a second UE; and means to receive, in response to the measurement request, a measurement of current cellular interference experienced by the first UE and the second UE.

Example 41 may include one or more computer readable media comprising instructions configured, upon execution of the instructions by a computing device, to: receive a request from a user equipment (UE) for a radio resource allocation of a radio resource for a transmission of a device-to-device (D2D) signal; predict a cellular interference to a third generation partnership project (3GPP) long term evolution (LTE) signal caused by the transmission of the (D2D) signal by the UE; allocate a D2D radio resource of a radio frame configured to carry only D2D signals to the UE if the cellular interference is above a threshold; and allocate a hybrid radio resource of a radio frame configured to carry D2D signals and 3GPP LTE signals to the UE if the cellular interference is below the threshold.

Example 42 may include the one or more computer readable media of example 41, wherein the instructions are further to transmit the indication of the D2D radio resource or the hybrid radio resource to the UE.

Example 43 may include the one or more computer readable media of example 41, wherein the 3GPP LTE signal is an uplink 3GPP LTE signal.

Example 44 may include the one or more computer readable media of example 41, wherein the 3GPP LTE signal is a downlink 3GPP LTE signal.

Example 45 may include the one or more computer readable media of any of examples 41-44, wherein the UE is a first UE, and wherein the instructions are further to transmit, from the eNB, a measurement request to the first UE and a second UE; and receive, in response to the measurement request, a measurement of current cellular interference experienced by the first UE and the second UE.

Although certain embodiments have been illustrated and described herein for purposes of description, this application is intended to cover any adaptations or variations of the embodiments discussed herein. Therefore, it is manifestly intended that embodiments described herein be limited only by the claims.

Where the disclosure recites "a" or "a first" element or the equivalent thereof, such disclosure includes one or more such elements, neither requiring nor excluding two or more such elements. Further, ordinal indicators (e.g., first, second or third) for identified elements are used to distinguish between the elements, and do not indicate or imply a required or limited number of such elements, nor do they indicate a particular position or order of such elements unless otherwise specifically stated.

What is claimed is:

1. A user equipment (UE) comprising:
   radio resource identification circuitry to identify a first radio resource in a radio frame based at least in part on:
      a predicted cellular interference caused by a transmission of a device-to-device (D2D) signal by the UE on the first radio resource at a first power level to a transmission of a predicted third generation partnership project (3GPP) long term evolution (LTE) signal, wherein the predicted cellular interference is based at least in part on a D2D transmission power threshold; and
      a predicted D2D interference to the D2D signal caused by the transmission of the predicted 3GPP LTE signal; and
   transmitter circuitry coupled with the radio resource identification circuitry, the transmitter circuitry further to transmit the D2D signal on the first radio resource at the first power level at a time of a transmission of an uplink 3GPP LTE signal on a second radio resource in the radio frame by a second UE at a second power level.

2. The UE of claim 1, wherein a received signal strength at an eNodeB (eNB) of the D2D signal is less than a received signal strength at the eNB of the uplink 3GPP LTE signal.

3. The UE of claim 1, wherein the radio resource identification circuitry is further to determine the predicted cellular interference.

4. The UE of claim 1, wherein the first radio resource and the second radio resource at least partially overlap one another in time or frequency.

5. The UE of claim 1, wherein the predicted 3GPP LTE signal is an uplink signal and the predicted cellular interference is predicted cellular interference experienced by an eNodeB (eNB).

6. The UE of claim 1, wherein the predicted 3GPP LTE signal is a downlink signal and the predicted cellular interference is predicted cellular interference experienced by the UE.

7. The UE of claim 1, wherein the radio resource identification circuitry is further to identify the first radio resource based at least in part on an indication of the first radio resource received by the UE from an eNodeB.

8. The UE of claim 1, further comprising a touchscreen display coupled with processor circuitry.

9. A method comprising:
predicting, by a user equipment (UE), a cellular interference that would be caused by a device-to-device (D2D) signal transmitted by the UE in a radio frame at a first power level to a third generation partnership project (3GPP) long term evolution (LTE) signal in the radio frame; wherein the predicted cellular interference is based at least in part on a D2D transmission power threshold;
predicting a D2D cellular interference caused by the transmission of the 3GPP LTE signal in the radio frame;
identifying, by the UE, a radio resource in the radio frame based at least in part on the predicted cellular interference and the predicted D2D cellular interference; and
transmitting, by the UE, the D2D signal on the radio resource.

10. The method of claim 9, wherein the 3GPP LTE signal is a 3GPP LTE uplink signal, and the cellular interference is cellular interference at an eNodeB.

11. The method of claim 9, wherein the UE is a first UE, the 3GPP LTE signal is a 3GPP LTE downlink signal, and the cellular interference is cellular interference at a second UE.

12. The method of claim 9, wherein the identifying the radio resource is based at least in part on receiving, by the UE, an indication of the radio resource from an eNodeB.

* * * * *